United States Patent
An

(10) Patent No.: US 8,928,738 B2
(45) Date of Patent: Jan. 6, 2015

(54) ADAPTER AND CORRESPONDING METHODS FOR ADDING 3D FUNCTION TO A 2D DIGITAL CAMERA

(71) Applicant: Wenge David An, Germantown, MD (US)

(72) Inventor: Wenge David An, Germantown, MD (US)

(*) Notice: Subject to any disclaimer, the term of this patent is extended or adjusted under 35 U.S.C. 154(b) by 0 days.

(21) Appl. No.: 14/181,720

(22) Filed: Feb. 16, 2014

(65) Prior Publication Data
US 2014/0160242 A1 Jun. 12, 2014

Related U.S. Application Data

(62) Division of application No. 13/107,931, filed on May 15, 2011, now abandoned.

(60) Provisional application No. 61/424,023, filed on Dec. 16, 2010.

(51) Int. Cl.
*H04N 13/00* (2006.01)
*H04N 13/02* (2006.01)
*G03B 17/56* (2006.01)

(52) U.S. Cl.
CPC ............ *H04N 13/026* (2013.01); *G03B 17/565* (2013.01); *H04N 13/0217* (2013.01)
USPC .................................. 348/46; 348/E13.074

(58) Field of Classification Search
USPC ................. 382/154; 348/42, 49, E13.007, 348/E13.016, E13.024, E13.065, E13.072
See application file for complete search history.

(56) References Cited

U.S. PATENT DOCUMENTS

| 475,084 | A | | 5/1892 | Ives |
| 1,454,218 | A | | 5/1923 | Folmer |
| 2,299,002 | A | | 10/1941 | Austin |
| 2,313,561 | A | | 3/1943 | Mainardi et al. |
| 2,360,322 | A | | 10/1944 | Harrison |
| 2,413,996 | A | | 1/1947 | Ramsdell |
| 4,436,369 | A | | 3/1984 | Bukowski |
| 5,495,370 | A | * | 2/1996 | Tuffen ........................... 359/402 |
| 6,643,396 | B1 | * | 11/2003 | Hendriks et al. ............... 382/154 |
| 7,181,061 | B2 | | 2/2007 | Kawano et al. |

OTHER PUBLICATIONS

Clark et al. "Single-camera computational stereo using a rotating mirror," in Proc. Brit. Mach. Vis. Conf., 1994, pp. 13-16.*

* cited by examiner

*Primary Examiner* — Richard Torrente
*Assistant Examiner* — Frank Huang

(57) ABSTRACT

A combination of a 3D optical adapter and corresponding digital process methods attached and updated to a conventional 2D digital camera so the digital camera can capture, save and transfer 3D stereoscopic digital images as well.

4 Claims, 16 Drawing Sheets

ADAPTER AND CORRESPONDING METHODS FOR ADDING 3D FUNCTION TO A 2D DIGITAL CAMERA

CROSS-REFERENCE TO RELATED APPLICATIONS

This application is a Division of application Ser. No. 13/107,931, filed 2011 May 15, which claims the benefit of Provisional Application No. 61/424,023, filed 2010 Dec. 16 by the present inventor.

FEDERALLY SPONSORED RESEARCH

Not Applicable

REFERENCE TO SEQUENCE LISTING, A TABLE, OR A COMPUTER PROGRAM LISTING COMPACT DISK APPENDIX

Not Applicable

FIELD OF THE INVENTION

The present invention is in the technical field of digital cameras. More particularly, the present invention is in the technical field of 3D digital cameras. Furthermore particularly, the present invention is in the technical field of adding 3D function to a 2D digital camera so that 3D stereoscopic digital images can be captured, saved and transferred by the 2D digital camera. The "digital camera" in the present invention is a generic technical field including digital still photo camera, digital live video camera and digital video camcorder. The "digital image" in the present invention is the digital image source to generate still image and live video. In the present invention, 2D is the abbreviation of "2(two) Dimensional", 3D is the abbreviation of "3(three) Dimensional", and "3D digital image" means "three dimensional stereoscopic left-right digital image pair".

BACKGROUND OF THE INVENTION

1. Field

Conventional 3D digital image taking products, such as 3D digital cameras, 3D digital camcorders and the like, are typically based on either dual digital camera systems or dual lens and sensor digital camera systems. These systems rely on extraordinary mechanisms to maintain both optical and mechanical synchronization while capturing 3D stereoscopic left-right image pairs, thus causing products to be too complicated and expensive.

There are also a few ideas for 3D digital image taking that use a single digital camera with a single lens and sensor. However, all of those ideas fall into problems such as un-simultaneous left and right image capturing, unrealistic and inflexible distance between left and right view, un-normal aspect ratio, un-adjustable convergence angle, very low usage of image sensor area, or the optical adapter blocks detectors and flashlight on the camera, and so on. Therefore, it is not practical to make a 3D digital camera product according to those ideas.

2. Prior Art

In a prior art U.S. Pat. No. 1,454,218, Mar. 8, 1923 described a dual lenses 3D adaptor. This adaptor can only output un-normal wide panoramic aspect ratio 2.67:1 due to the left and right images are located up to down. Besides, it requires people to adjust both lenses individually for taking a 3D image because it has no synchronization for left and right lenses.

In another prior art U.S. Pat. No. 2,313,561, Mar. 9, 1941, described a single lens 3D adaptor approach. This adaptor directly applies the traditional Tri-Delta optical mechanism, so that the adaptor has all disadvantages that traditional Tri-Delta has, such as too big to fit on a camera, too complicated to make a viewer/finder, vertically image outputting, and so on.

Furthermore, in 3D cameras, conventional methods for saving and transferring 3D stereoscopic left-right digital image pairs, are either to format left and right images into one image by locating them horizontally side by side then save and transfer them as a single 2D image; or to save them individually as two separated images and transfer them alternatively one followed the other, for instance, the MPO format which is used in Fujifilm W1 3D camera. The first method duplicates the complication of the image and it is incompatible with normal 2D digital image processes that read each image by scanning the horizontal pixel lines. The second method not only breaks the relationship of left and right images causing complications in 3D digital image process and management, but also breaks the similarity between images while transferring or streaming 3D digital images (e.g. 3D digital video); of cause, it is hardly compatible with normal 2D image processes as well.

SUMMARY OF THE INVENTION

The present invention is a combination of a 3D optical adapter and corresponding digital process methods attached and updated to a conventional 2D digital camera for capturing, saving and transferring 3D digital images by using the 2D digital camera. The 3D optical adapter acquires the 3D stereoscopic image from the real world, executes the simultaneous optical process of the present invention for converting the image into a 2CS3 (2D Camera Suitable 3D) image, so that the 2D digital camera with corresponding digital processes can capture the image directly. And, after capturing, the digital camera executes corresponding digital processes to generate the 3D digital image. The 3D digital image will be also formatted into the disclosed SVLR (Symmetrical Vertical Left-Right) raw format therefor the 3D digital image can be further saved and transferred using conventional 2D image formats. The present invention ingeniously solved fatal problems existing in all other 3D image taking ideas. Definitely, the present invention will provide a flawless 3D function to a conventional 2D digital camera.

The goal of the present invention is to make and/or upgrade 2D digital camera products so that besides having the original 2D function, people can also use this kind of product to capture, save and transfer 3D digital images in a fully 2D compatible way.

DETAILED DESCRIPTION OF THE INVENTION

Figure 1:
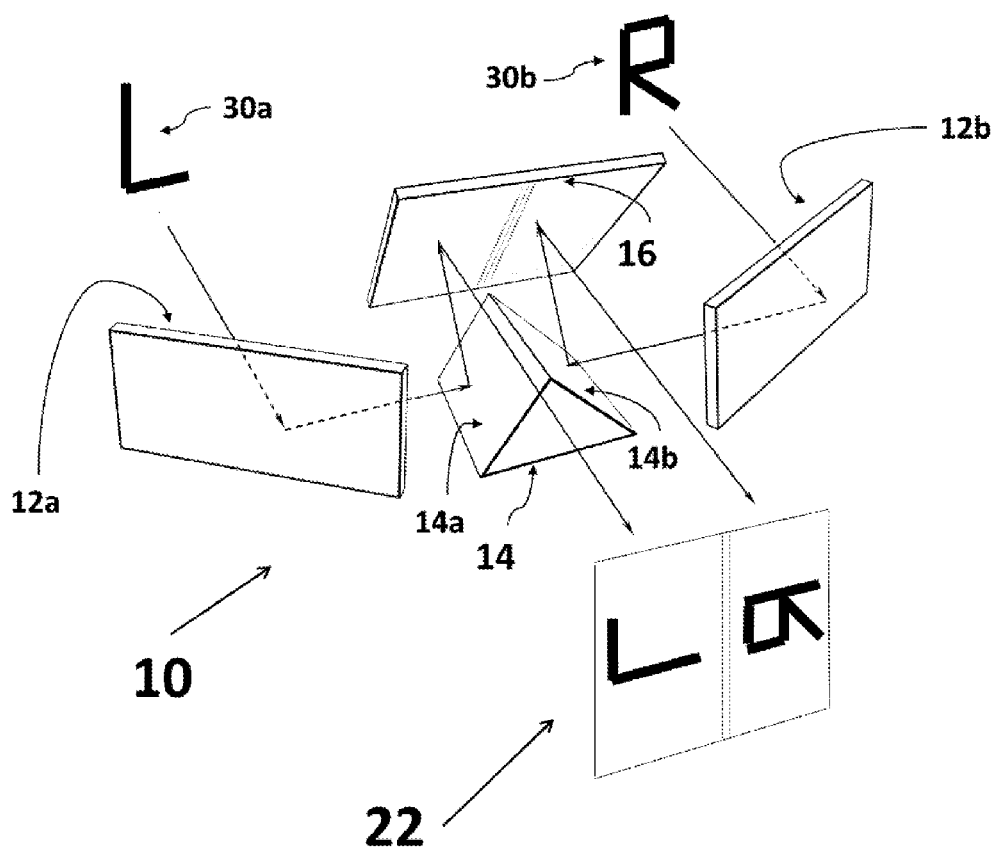
FIG. 1 is a perspective view of a basic embodiment of the 3D optical adapter of the present invention and the generated 2CS3 (2D Camera Suitable 3D) optical image.

Detailed description of the 3D optical adapter of the present invention:

Referring now to the invention in more detail, in FIG. 1, it shows a perspective view of a basic embodiment of the 3D optical adapter of the present invention. There is shown a 3D optical adapter 10 having 2 view mirrors they are the left view mirror 12a and the right view minor 12b, a right angle prism minor 14 with perpendicular minor surfaces 14a and 14b, as well as an output mirror 16.

In more detail, still referring to FIG. 1 of the present invention, both view mirrors 12a and 12b are paned towards both the forward direction and the right angle prism minor 14. The output mirror 16 is tilted towards both the back direction and the right angle prism minor 14 as well.

In even more detail, still referring to FIG. 1 of the present invention, the light from 3D object (not shown in figures) can be observed by left and right human eyes as a 3D left-right image pair with the left image 30a and the right image 30b. The left image 30a is received by the left view minor 12a then is reflected by the minor 12a to the minor surface 14a, there, it is reflected again to the left area of the output minor 16. Similarly, the right image 30b is also received by the right view mirror 12b then is reflected by the mirror 12b to the mirror surface 14b, there, it is reflected again to the right area of the output minor 16 as well. Eventually, both left image 30a and right image 30b of the 3D left-right image pair are sent out together side by side closely from the output minor 16. In result, they form the full image 22 as shown in FIG. 1.

In further detail, still referring to the FIG. 1 of the present invention, there is a left-right distance in between the left view minor 12a and right view mirror 12b. The left-right distance is functioning as the distance in between two human eyes for providing 3D space difference between left and right images. This distance can be 20 mm-800 mm. The image 30a which is received by the left view minor 12a is the image that is relative to the object viewed by the left eye. Similarly, the image 30b which is received by the right view minor 12b is the image that is relative to the object viewed by the right eye. The image 22 is the combination of both left and right images from both 12a and 12b, thus, it includes full 3D information of the 3D object to be seen by human eyes.

Figure 2:
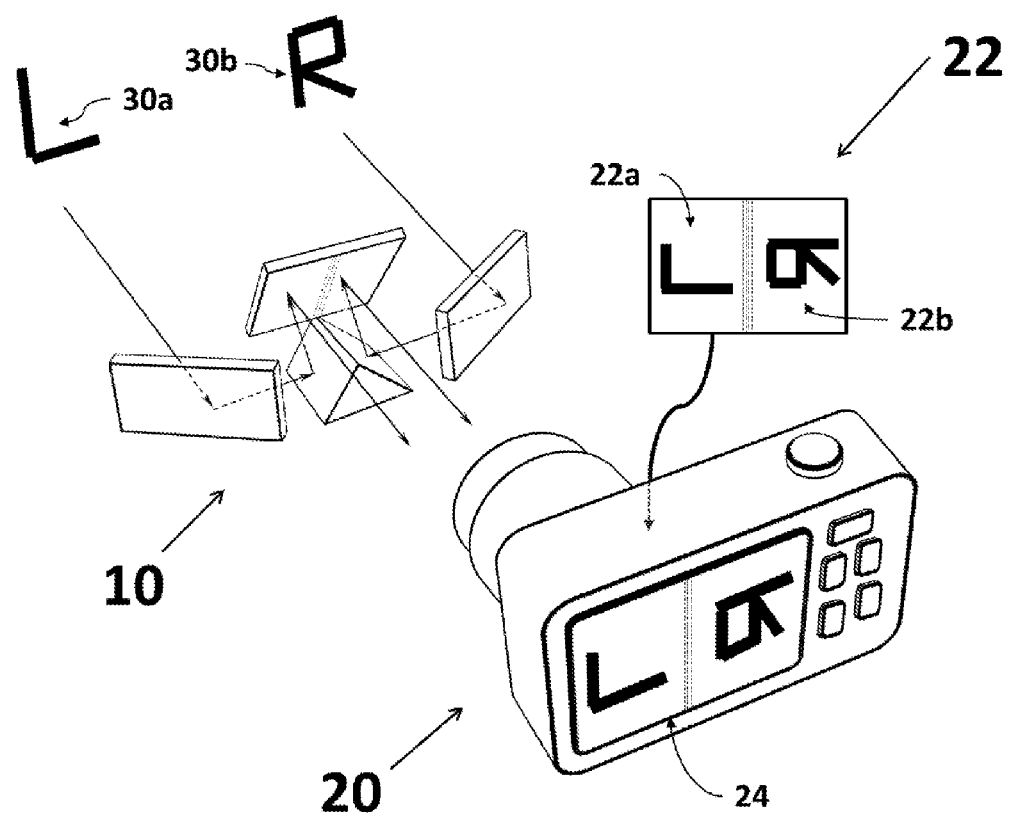
FIG. 2 is a principle perspective view of a conventional 2D digital camera working with the 3D optical adapter of the present invention.

The application of the 3D optical adapter of the invention is shown as FIG. 2. The 3D optical adapter 10 of the invention is located in front of the lens of a 2D digital camera 20. The 2D digital camera 20 is used for taking the output image from the 3D optical adapter 10 in FIG. 2 of the invention. The image 22 is the image from the digital image sensor inside the 2D digital camera 20.

Figure 3:
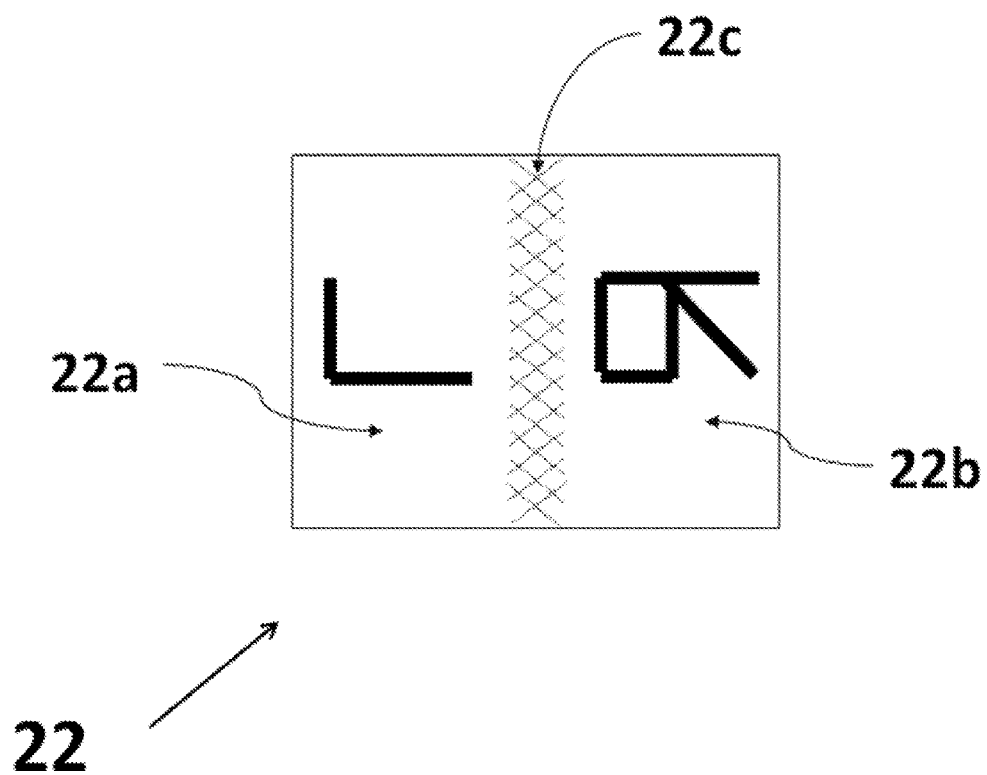
FIG. 3 is a perspective view of an exemplar of the 2CS3 image which is captured by the sensor of the 2D digital camera through the 3D optical adapter of the present invention.

In further detail referring to FIG. 2 and FIG. 3, the image 22, which is captured by the image sensor of the 2D digital camera 20 in FIG. 2 is constructed with a left image 22a, a right image 22b as well as a left-right image overlapping area 22c located in the middle area of the image 22, they are all shown in the FIG. 3 of the present invention as well. In the detail of the image 22 of FIG. 2 and FIG. 3 of the present invention, the left image 22a is produced from the original image 30a by the 3D optical adapter 10 through optical image processes including a 90 degrees rotating in clockwise and followed by a flipping 180 degrees vertically; the right image 22b is produced from the original image 30b by the 3D optical adapter 10 though the similar optical image processes including a 90 degrees rotating in counterclockwise and followed by flipping 180 degrees vertically.

Referring now to the FIG. 1 to FIG. 3 of the present invention, the 90 degree image rotation of both left and right images is crucial in providing significant area usage of the 2D digital image sensor because it maintains the normal 2D aspect ratio (e.g. 16:9 or 2:1) while forming the resultant image 22 as shown in FIG. 3. The 180 degrees image flipping of both left and right images is crucial in providing straight backward image output so a 2D camera can capture it as usual. The angle between two view minors is also functioning as human eyes convergence. So, to adjust the angle of any side view mirror will adjust the convergence point.

Therefore, the image 22 is suitable for a 2D camera and it can be captured efficiently by a 2D digital camera in the way that the 2D camera is designed to be.

In conclusion, the image 22 as shown in FIG. 1 is an exemplar of the 2D Camera Suitable 3D stereoscopic left-right image pair, which is called in abbreviation as 2CS3 image in the present invention.

As mentioned previously, image 22 in FIG. 2 and FIG. 3 of the present invention that is captured by the digital image sensor inside the 2D camera 20 includes the full 3D information of the object. The following description will provide the details of corresponding digital process methods including reproducing left and right 3D digital image pair from the image 22.

Detailed description of exemplars of corresponding digital process methods of the present invention:

Corresponding digital processes in the present invention are performed by the embedded firmware/software of the microprocessor and/or ASIC/SoC in the 2D digital camera.

Figure 4:
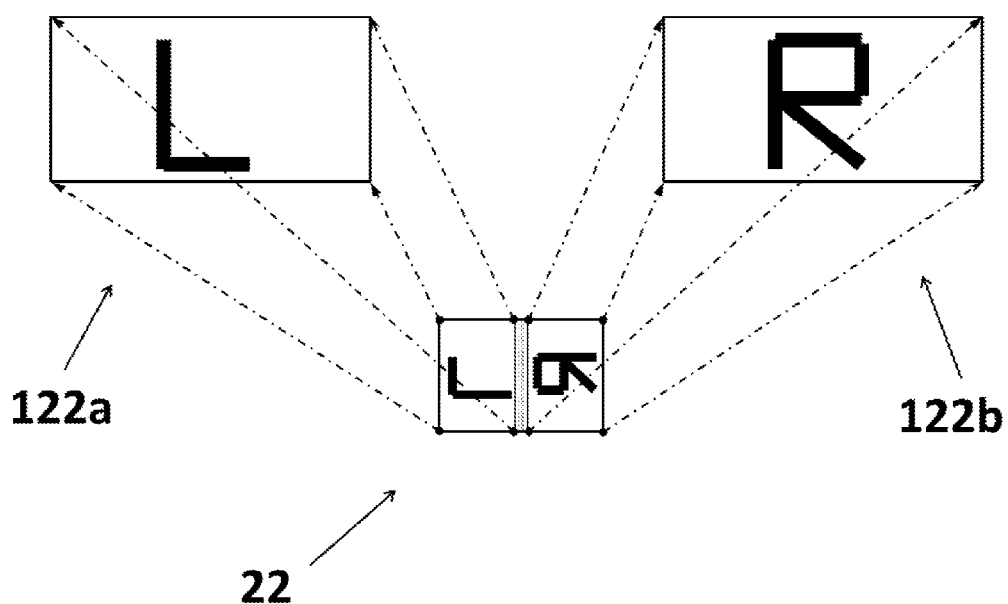
FIG. 4 is a principle diagram of the left image and the right image of the 3D image pair that is reproduced by the corresponding 3D digital processes of the present invention.

Referring now to the invention in more detail, in FIG. 4, there is a digital image 22 captured by the digital image sensor of a 2D digital camera through the 3D optical adapter of the invention; a left digital image 122a and a right digital image 122b.

In even further detail referring to FIG. 3 to FIG. 4, the 3D digital left image 122a and right image 122b are restored from the digital image 22 by digital process methods of the present invention. The digital image 22 is from the digital image sensor in the 2D digital camera, thus, it has an aspect ratio of 4:3 in general. The image 22 can be used to restore a 3D digital image pair including left image 122a and right image 122b. The overlapped area 22c shown in FIG. 3 is removed from the restored 3D digital image pair. And the restored 3D digital image pair is cropped to have a common aspect ratio (e.g. 16:9 or 2:1) for each left or right image.

Figure 5:
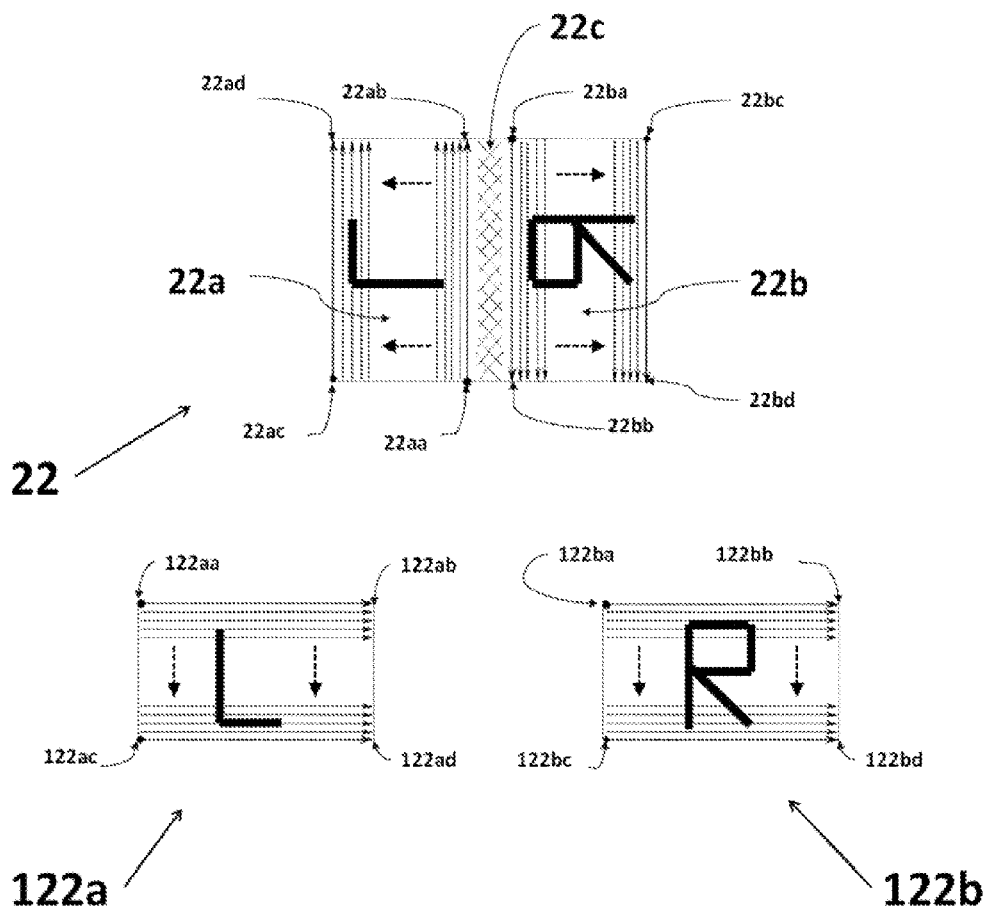
FIG. 5 is a principle diagram of an exemplar of cropping and reproducing methods in the corresponding 3D digital process methods of the present invention.

In the further detail referring to FIG. 5 of the present invention, there is illustrated a digital image 22 buffered in the digital image sensor or buffer memory. The digital image 22 includes tree digital image areas; they are the left image area 22a, the right image area 22b, and the overlapped area 22c. The cropping digital process crops images digitally by the way so called pixel locating.

In the furthermore detail, now referring to FIG. 5, there is illustrated an exemplar cropping digital image process method. The left image area 22a is cropped as all its pixels are located in the area from the left edge of the image 22 (22ad-22ac) to the vertical line (22ab-22aa) that makes the left image area 22a to have a common aspect ratio (e.g. 16:9 or 2:1) and without reaching the overlapping area 22c; Similarly, the right image area 22b is cropped as all its pixels are located in the area from the right edge of the image 22 (22bc-22bd) to the vertical line (22ba-22bb) that makes the right image area 22b to have a common aspect ratio same as 22a (e.g. 16:9 or 2:1) and without reaching the overlapping area 22c. The details are shown in FIG. 5.

In the FIG. 5 there are also two digital image memory areas for restoring digital images, they are restored image area 122a and restored image area 122b. In the more detail, the FIG. 5 illustrates the left digital image restoring process method rotates the left image counterclockwise by 90 degrees then flips the image horizontally by 180 degrees; And the right digital image restoring process method rotates the right image clockwise by 90 degrees then flips the image horizontally by 180 degrees. The restoring digital image process method does image rotating and flipping digitally by the way so called pixel moving.

The FIG. 5 also shows the exemplar details of the process method to move the left digital image 22a pixel by pixel to 122a and move the right digital image 22b pixel by pixel to 122b so that the left image is restored in 122a and the right image is restored in 122b.

Figure 6:
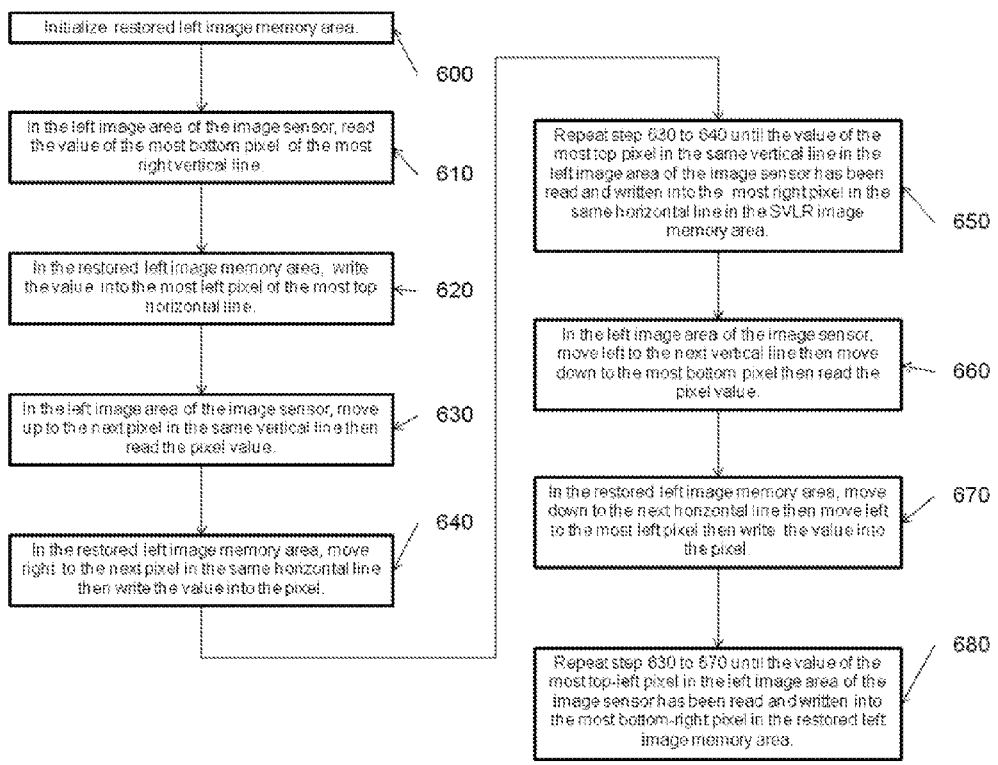
FIG. 6 is a flowchart of an exemplar of the left image cropping and restoring process method in the corresponding 3D digital process methods of the present invention.

In even further detail referring to FIG. 5 of the present invention, the process method for the restoration of the left image is to move all pixel values in the left digital image area 22a of the digital image 22 in the digital image sensor or buffer memory, into the restored left digital image memory area 122a through the digital image process as illustrated in FIG. 5 and FIG. 6 of the present invention.

FIG. 6 shows a flowchart of an exemplary process, in which the 3D left digital image 22a that is captured using the 3D optical adapter of the present invention is restored in the restored left image memory area 122a.

Figure 7:
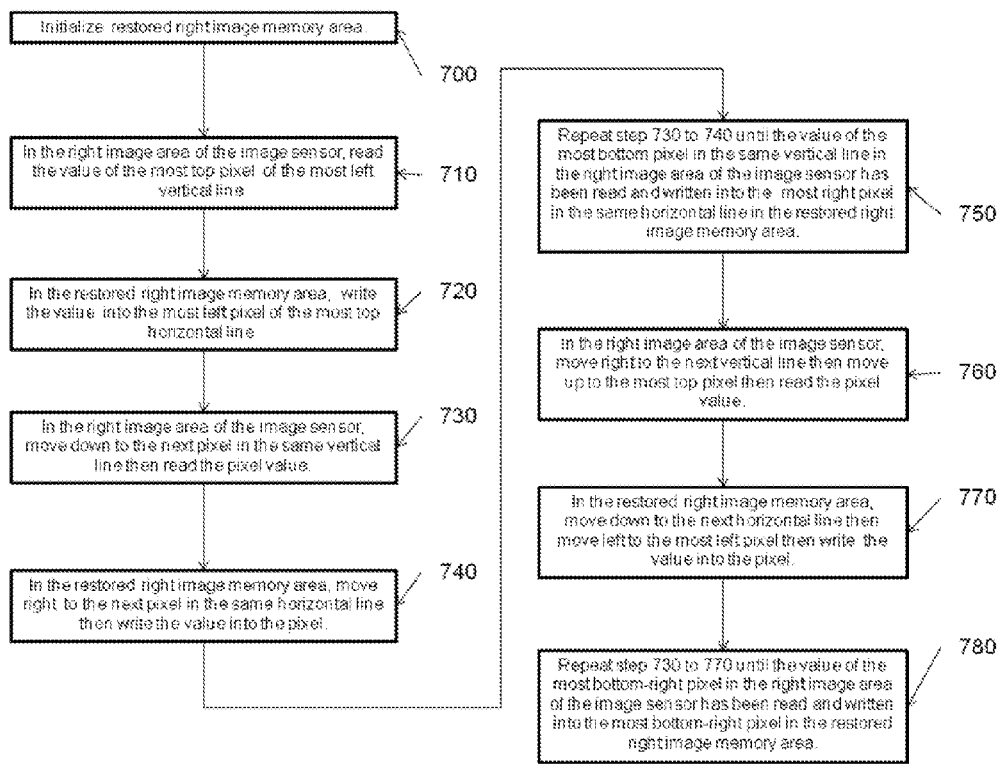
FIG. 7 is a flowchart of an exemplar of the right image cropping and restoring process method in the corresponding 3D digital process methods of the present invention.

Similarly, the process method for restoring the right image is to move all pixel values in the right digital image area 22b of the digital image 22 in the digital image sensor or buffer memory, into the restored right digital image memory area 122b through the digital image process as illustrated in FIG. 5 and FIG. 7 of the present invention.

FIG. 7 shows a flowchart of an exemplary process, in which a 3D right digital image that is captured using the 3D optical adapter of the present invention is restored in the restored right image memory area 122b.

Figure 8:
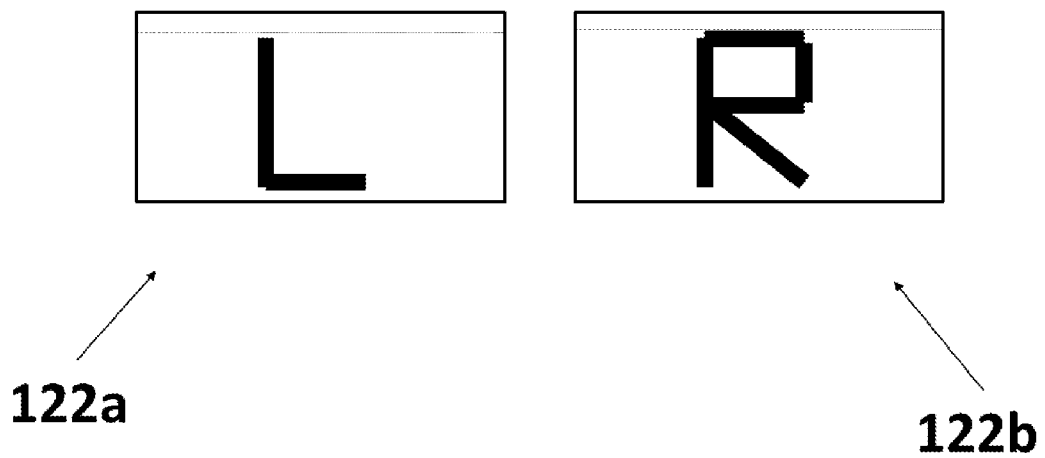
FIG. 8 is a diagram of the restored 3D left-light image pair in the conventional 2D image raw format for saving and transferring.

Referring now to FIG. 8, there is the restored 3D digital left image 122a and right image 122b. The conventional 3D stereoscopic left and right digital image pair is saved and transferred as two separated conventional 2D digital images. Both left and right digital images Referring FIG. 9 of the present invention, a 3D Left finding/viewing mode is introduced into the 2D digital camera 20. In this mode, the LCD Finder/Viewer 24 only displays the cropped left image 22a. And the 3D digital image pair 22 will be captured based on the range, focus and exposure settings according to the 2D digital image 22a. And existing internal processes of the 2D digital camera such as center/multi point auto focus/exposure and so on are based on the information from image 22a only.

Figure 10:
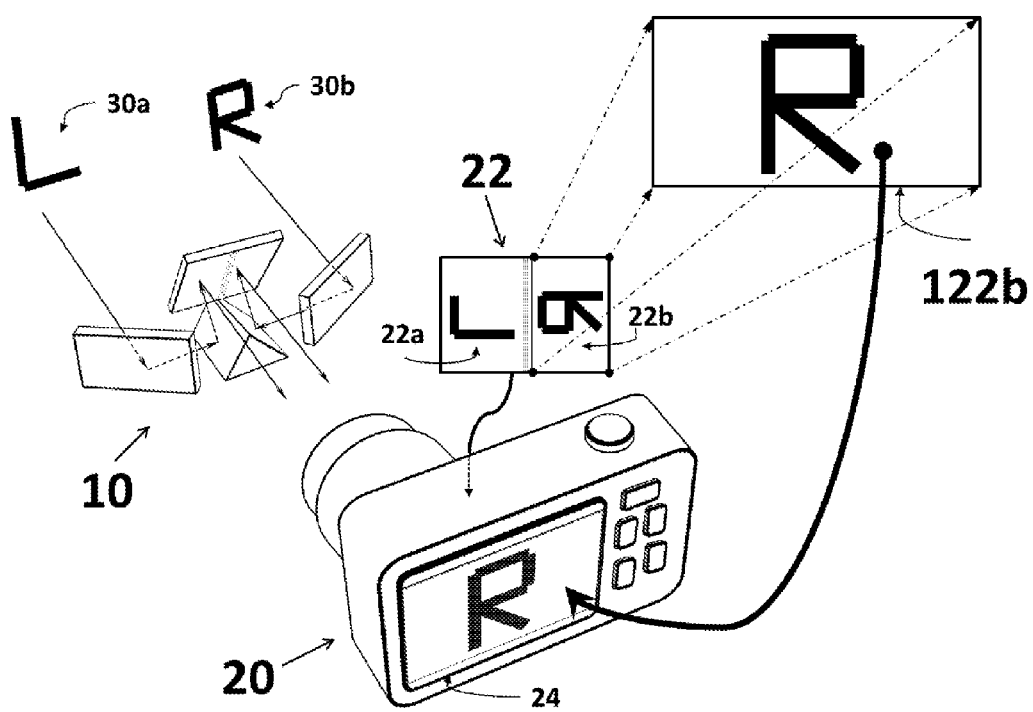
FIG. 10 is a principle perspective view of an exemplar of the right finding/viewing mode in the corresponding digital process methods of the present invention.

Referring FIG. 10 of the present invention, a 3D Right finding/viewing mode is introduced into the 2D digital camera 20 as well. In this mode, the LCD Finder/Viewer 24 only displays the cropped right image 22b. And the 3D digital image pair 22 will be captured based on the range, focus and exposure settings according to the 2D digital image 22b. And existing internal processes of the 2D digital camera such as center/multi point auto focus, exposure and so on are based on the information from image 22b only.

Figure 11:
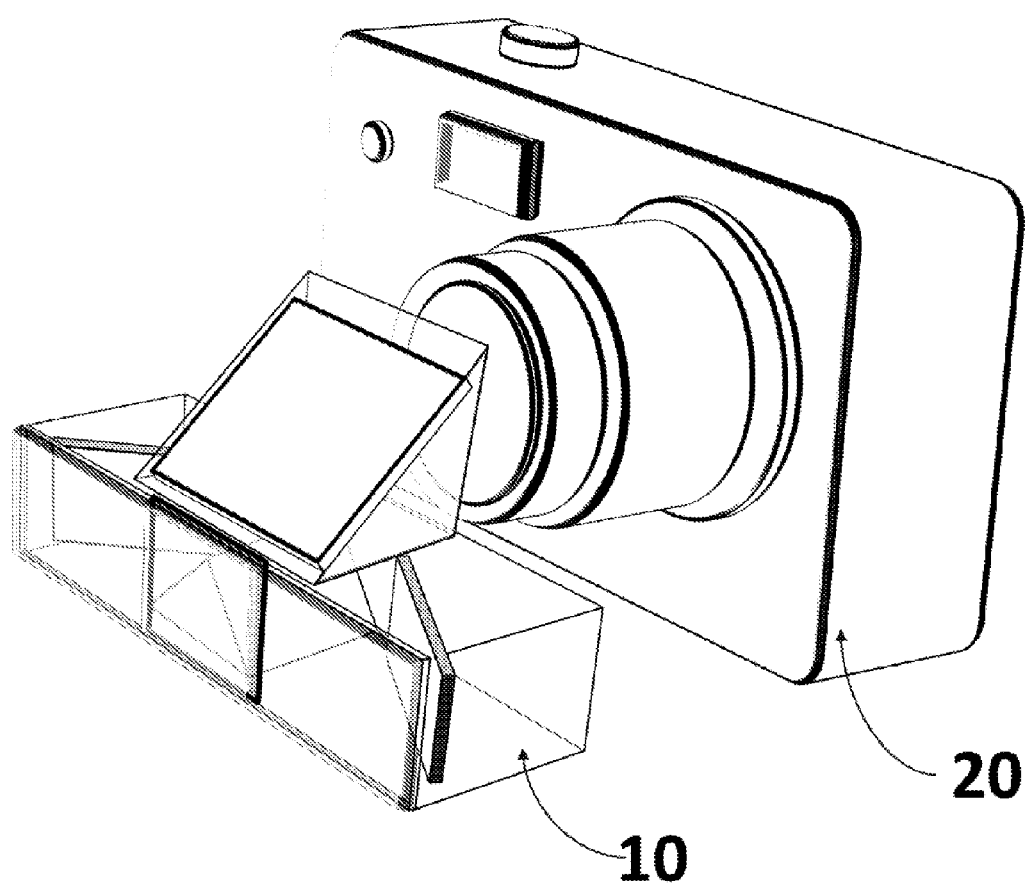
FIG. 11 is a perspective view of the physical relation of the 3D optical adapter with a common 2D digital camera of the present invention.

Referring now to the invention in more detail, in FIG. 11, it illustrates the physical relation between a 2D digital camera and the 3D optical adapter of the present invention. The 3D optical adapter 10 of present invention can be mounted onto the lens of the 2D digital camera if the lens is big enough with a standard photo camera filter mounting thread, for example, a DSLR.

Referring now to the invention in more detail, in FIG. 11, it shows clearly that the 3D optical adapter 10 of the present invention is designed to fit in front of the 2D digital camera without blocking detectors and flashlight which are equipped on the body of the 2D digital camera. That is because the main body of the 3D optical adapter on the present invention is located in the lower level under the lens of the 2D digital camera.

Figure 12:
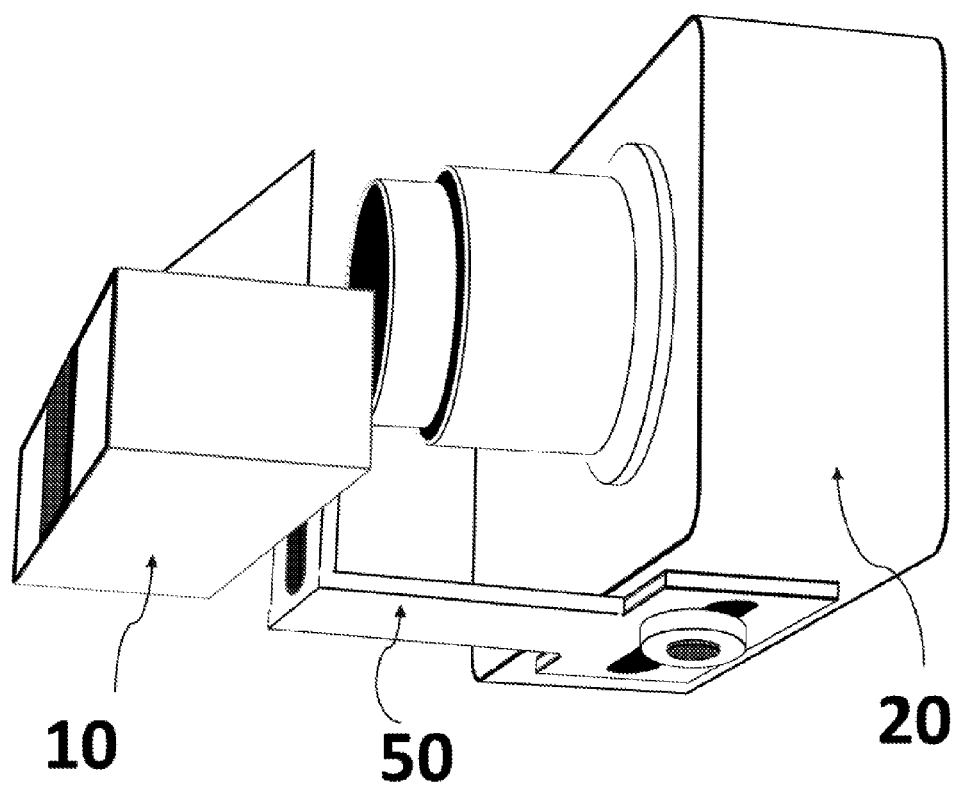
FIG. 12 is a perspective view of a bracket which connects a 3D optical adapter with a common 2D digital camera of the present invention.

Referring now to the FIG. 12 of the invention, it shows a suggested mounting bracket 50 is applied to connect the popular small 2D digital camera 20 with the 3D optical adapter 10 of the present invention. The ways of attaching the 3D optical adapter to the 2D camera is not fixed so the attachment method of the 3D optic adapter can be changed in accordance to the size and shape of the individual 2D digital camera.

Figure 13:
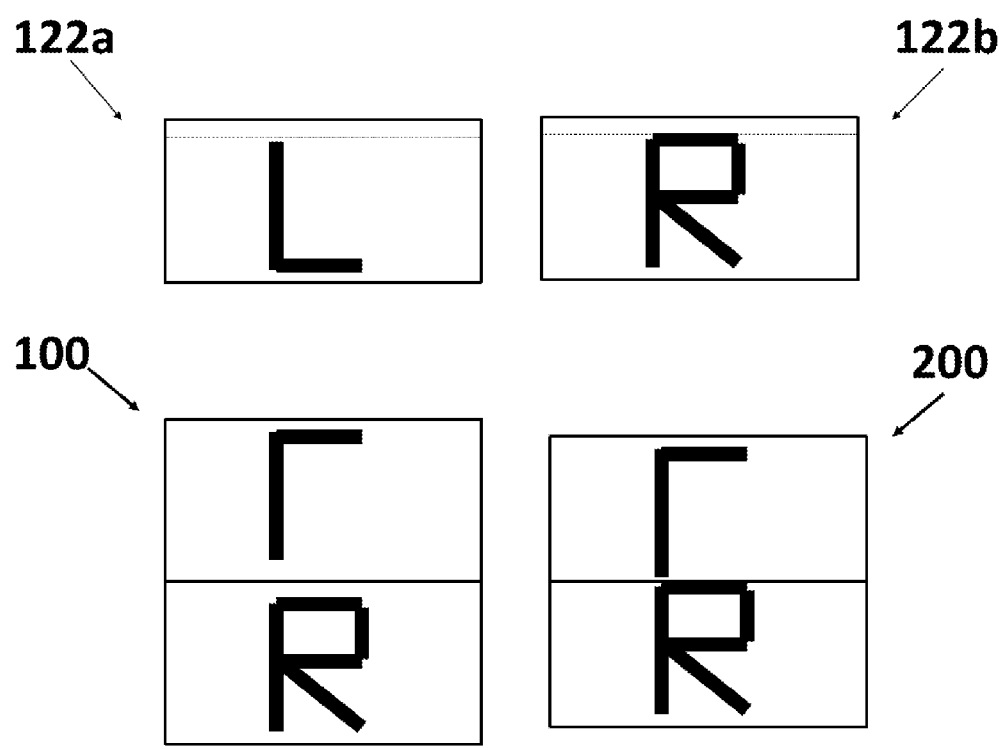
FIG. 13 is a principle diagram of the SVLR (Symmetrical Vertical Left-Right) 3D digital image raw format in 3D digital image process methods of the present invention.

Referring now to the invention in more detail, in FIG. 13, it discloses the Symmetrical Vertical Left-Right 3D digital image raw format, which is called in abbreviation as SVLR raw format of the present invention. There is the restored 3D left digital image 122a and right digital image 122b in FIG. 13. Unlike conventional 3D image formats, the SVLR raw format 100 and 200 in FIG. 13 of the present invention is constructed by locating the left image 122a on the top half of the 3D digital image and locating the right image 122b on the bottom half of the 3D digital image. Besides, the left image 122a is also flipped upside down so that in the result, the SVLR formatted 3D stereoscopic digital image is almost symmetrical vertically because of the similarity of the left and right images, and eventually the output 3D digital image after SVLR formatting are as shown as 100 and 200 of the FIG. 13. The SVLR raw format in the present invention is a 2D compatible raw format and it is designed for storing and transferring 3D stereoscopic left and right digital image pair as a whole 2D image. The SVLR raw format merges similar top areas in both left image and right image together so that the compression rate of algorithms based on Discrete Cosine Transform (DCT) (e.g. JPEG) will be significantly increased. And the SVLR raw format also increases the similarities between images of an image serial (e.g. digital video), thus it also significantly lowers the bit-rate of the digital video stream which is encoded in popular 2D streaming technologies (e.g. MPEG).

Referring now to FIG. 13, there are restored 3D digital left image 122a and right image 122b. The 3D stereoscopic left and right digital image pair is formatted in the SVLR raw format 100 and 200 of the present invention. FIG. 13 shows that SVLR supports different aspect ratios. The 100 in FIG. 13 is SVLR 16:9, which is consisted of a left image and a right image are formatted in a commonly used 2D format and with aspect ratio either 16:9 (e.g. 1920×1080 pixels) or 2:1 (1920× 960 pixels).

Figure 9:
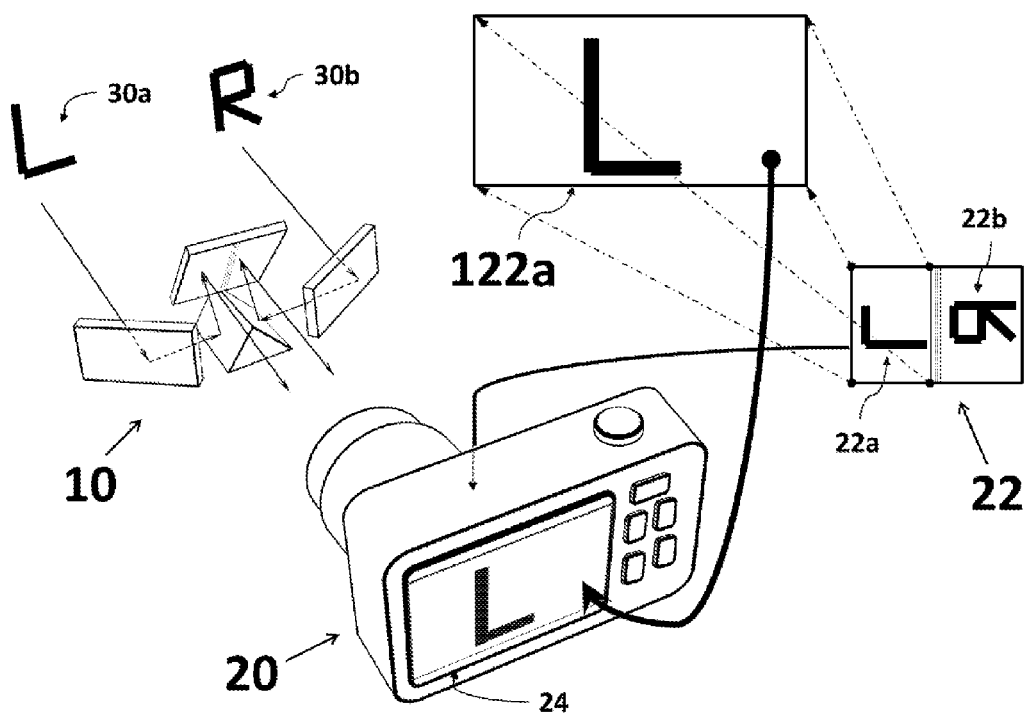
FIG. 9 is a principle perspective view of an exemplar of the left finding/viewing mode in the corresponding digital process methods of the present invention.

Referring now to the invention in more detail, in FIG. 9 to FIG. 10, both image 22a and image 22b in image 22 captured by the 2D digital camera sensor are from the same object 30 (not shown in figures) in front of the 2D digital camera 20. Related to the 2D digital camera 20, both image 22a and image 22b of the FIG. 9 to FIG. 10 have the same physical condition in the lighting and the distance. So the range, focus and exposure settings can be shared in the 2D digital camera 20.

and both are in aspect ratio of 16:9 (e.g. 1920×1080 pixels). The 200 in FIG. 13 is SVLR 2:1, which is consisted of a left image and a right image and both are in aspect ratio of 2:1 (e.g. 1920×960 pixels).

Figure 14:
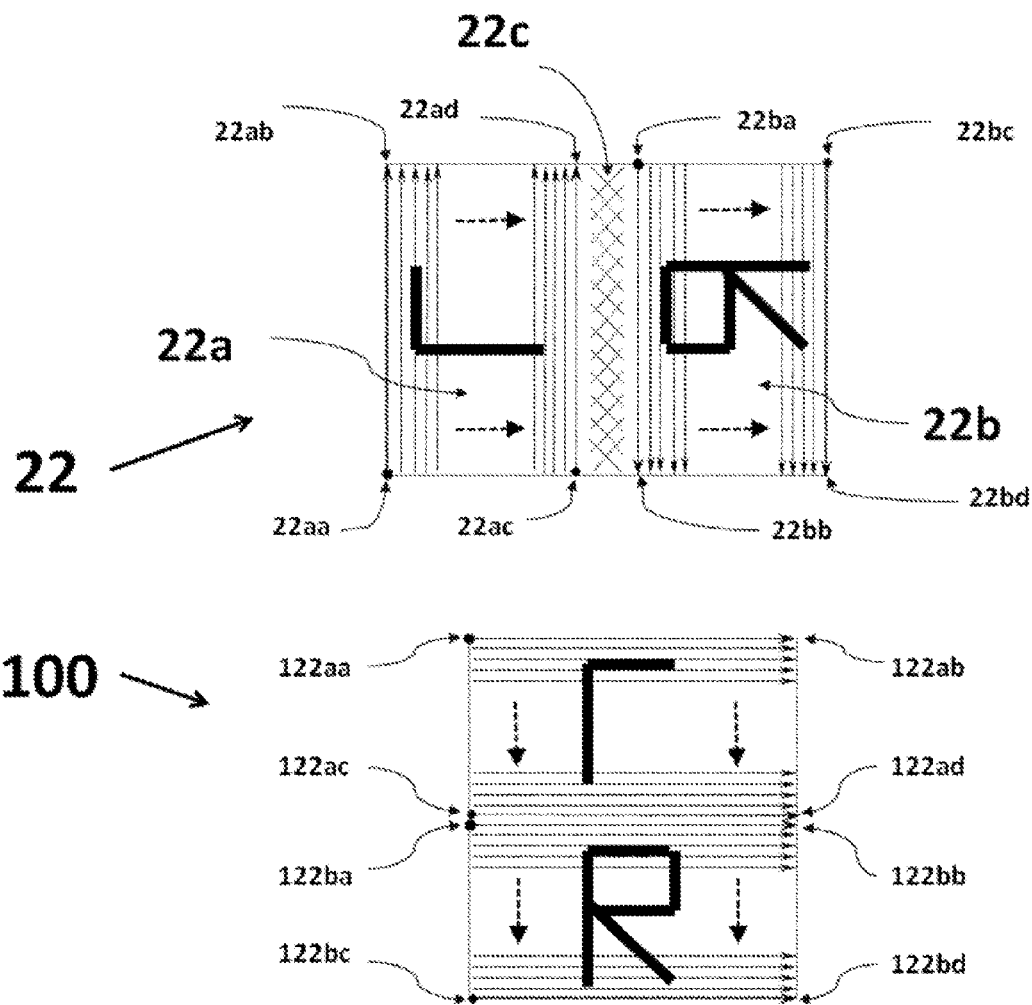
FIG. 14 is a principle diagram of an exemplar of the digital process method that formats the 2CS3 digital image directly into the SVLR 3D digital image raw format in the corresponding 3D digital process methods of the present invention.
Figure 15:
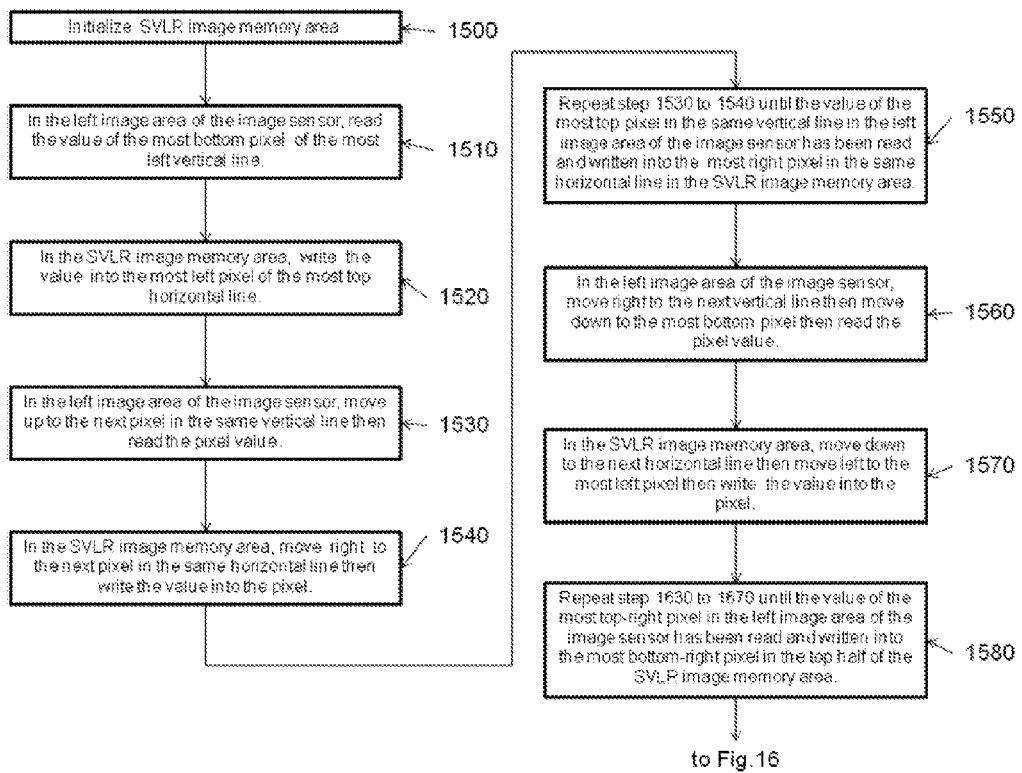
FIG. 15 and FIG. 16 is a flowchart of an exemplar of the digital process method that formats the 2CS3 digital image directly into the SVLR 3D digital image raw format in the corresponding 3D digital process methods of the present invention.
Figure 16:
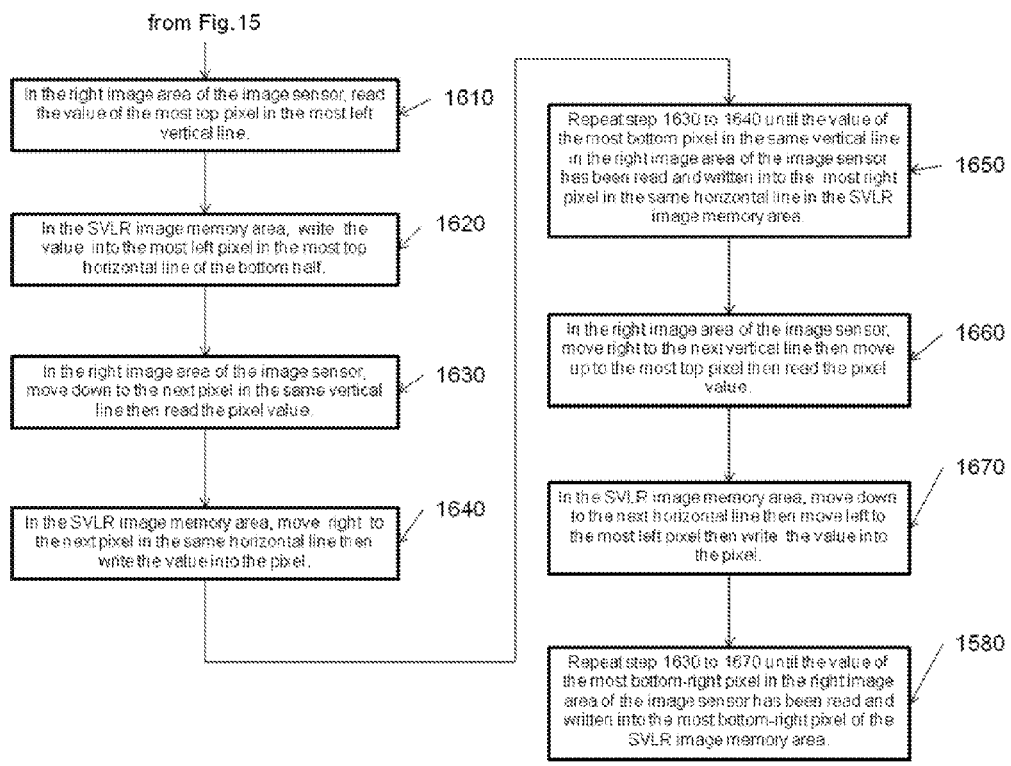

In the further detail referring to FIG. 14 to FIG. 16 of the present invention, an exemplar process method for the SVLR formatting which is to move all pixel values in both digital left image area 22a and right image 22b of the digital image 22 in the digital image sensor or buffer memory, into the SVLR digital image memory area 100 through the digital image process method as described in FIG. 14 to FIG. 16 of the present invention.

The advantages of the present invention are obvious and significant. The products based on the present invention will be providing both 3D and 2D function conveniently and its 3D function and result will be fully compatible with current 2D digital camera technologies. The combination of the ingenious 3D optical adapter and the corresponding restoring digital image process method makes the 2D digital camera is able to take 3D digital images. The present invention is practical, inexpensive and easy to be attached to a conventional 2D digital camera. Besides, the creative 2CS3 image in the present invention is almost perfect to a 2D camera without blocking any its existing function such as flashlight, finder and detector; and the SVLR raw format in the present invention will significantly increase the efficiency while 2D digital image technologies such as JEPG, MPEG etc. working on the 3D stereoscopic digital image pairs. The products based on the present invention will be popular soon.

While the present invention has been described in particular embodiments, the present invention should therefore not be limited by the above described embodiment, method, and examples, but by all embodiments and methods within the scope and spirit of the invention according to the following claims.

I claim:
1. A method of digital still images or digital live videos, comprising:
   providing a three dimensional (3D) stereoscopic digital image taking device, comprising:
      a two dimensional (2D) digital image taking device for detachably attaching an optical adapter, comprising at least a sensor with a predetermined aspect ratio;
      an optical adapter having a housing and plurality of mirrors, comprising:
         an image contra rotating means for rotating each optical image in a 3D image pair comprising a left image and a right image;
         wherein the contra rotating comprising a clockwise rotation and a counterclockwise rotation, so as to make both left and right images to be able to fit into the sensor sufficiently with an overlapping area; and
         an image merging means for merging both left and right images from said image contra rotating means together to form the whole image pair; and
         an image outputting means for restoring an image original facing direction to finalize and output the 2D camera suitable 3D image;
         wherein the step of using said output means further comprising:
            elevating said merged image pair along a direction perpendicular the original image facing direction; and
            restoring the facing direction of said merged image pair to the same direction that images originally face;
            wherein the left-right images pair at the sensor has the predetermined ratio of the camera and the image original facing direction;
         wherein the 3D image pair inside said 2D camera suitable 3D image is a contra rotated, reversed, top to top or bottom to bottom merged, and elevated image pair; wherein the facing direction of said 2D camera suitable 3D image is the same as the original image facing direction;
         wherein the contra rotating means rotates said left image from the left view mirror and said right image from the right view mirror simultaneously to fit both images efficiently into a single 2D image sensor, while keeping the predetermined aspect ratio;
         wherein the contra rotating means rotates both said left image and right image simultaneously while in opposite directions by 90 degree;
         wherein said image merging means merges said left image and right image proximate to each other side by side, along one of the images original top and bottom edge;
         wherein the image original facing direction is restored in the final 2D camera suitable 3D image so as to take advantage of the existing 2D camera structure such that it is convenient for the user to use the view finder of the 2D camera to find the location of an imaging object wherein the existing optical design of view finder has the same or similar aspect ratio of the 2D camera;

restoring 3D stereoscopic digital image pair from the said 2D camera suitable 3D image by a digital 2D camera suitable 3D image restoring means;

processing a digital 3D left-right image by a symmetrical vertical left-right digital image formatting means;

displaying the digital 3D left-right image for a viewer to visualize a 3D image.

2. The method of digital still images or digital live videos of claim 1, wherein the predetermined ratio is from 4:3 to 16:9.

3. The method of digital still images or digital live videos of claim 1, wherein said digital 2D camera suitable 3D image restoring means further comprising:

cropping the 3D image pair from the sensor of said 2D digital image taking device into the left image and the right image with the predetermined aspect ratio;

wherein the 3D stereoscopic left-right digital image pair is formed with the aspect ratio; and wherein an overlapped area between the left image and the right image is removed by the digital image cropping means;

contra rotating the cropped digital left image and right image by 90 degree in the opposite direction to restore the image top-bottom orientation, reversing both cropped and rotated digital left image and right image by 180 degree horizontally to restore the image left-right orientation;

whereby the 3D stereoscopic left-right digital image pair is fully restored.

4. The method of digital still images or digital live videos of claim 1, wherein said symmetrical vertical left-right digital image formatting means, further comprising:

reversing either left image or right image of the 3D stereoscopic left-right digital image pair about its horizontal axis, storing the reversed image of the 3D stereoscopic left-right digital image pair into either top half or bottom half of the symmetrical vertical left-right digital image, storing the un-reversed image of the 3D stereoscopic left-right digital image pair into the other half of the symmetrical vertical left-right digital image, whereby the symmetrical vertical left-right digital image pair is formed as a whole raw image for efficiently saving, processing, and transferring through the one or more 2D digital image processing technologies.

\* \* \* \* \*